(12) United States Patent
Browne et al.

(10) Patent No.: US 7,866,737 B2
(45) Date of Patent: Jan. 11, 2011

(54) ACTIVE MATERIAL ACTUATED LOUVER SYSTEM

(75) Inventors: Alan L. Browne, Grosse Pointe, MI (US); Nancy L. Johnson, Northville, MI (US); Jan H. Aase, Oakland Township, MI (US); James H. Brown, Costa Mesa, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 205 days.

(21) Appl. No.: 11/968,774

(22) Filed: Jan. 3, 2008

(65) Prior Publication Data

US 2008/0178526 A1 Jul. 31, 2008

Related U.S. Application Data

(60) Provisional application No. 60/887,409, filed on Jan. 31, 2007.

(51) Int. Cl.
*E06B 7/086* (2006.01)
(52) U.S. Cl. .............. 296/193.1; 49/74.1; 49/77.1; 49/82.1
(58) Field of Classification Search .............. 296/180.1, 296/180.3, 180.5, 193.1; 49/82.1, 73.1, 74.1, 49/77.1, 80.1, 86.1, 89.1, 90.1, 92.1; 454/221, 454/224
See application file for complete search history.

(56) References Cited

U.S. PATENT DOCUMENTS

| | | | | |
|---|---|---|---|---|
| 4,165,118 A | * | 8/1979 | Jensen | 296/50 |
| 4,497,241 A | * | 2/1985 | Ohkata | 454/258 |
| 4,867,499 A | * | 9/1989 | Stephan et al. | 296/50 |
| 4,926,921 A | * | 5/1990 | Heinemann et al. | 160/115 |
| 4,932,705 A | * | 6/1990 | Miller | 296/50 |
| 5,107,916 A | * | 4/1992 | van Roermund et al. | 160/6 |
| 5,516,178 A | * | 5/1996 | Grant | 296/57.1 |
| 5,591,079 A | * | 1/1997 | Saida | 454/155 |
| 5,752,877 A | | 5/1998 | Sun | |
| 6,412,853 B1 | * | 7/2002 | Richardson | 296/180.1 |
| 6,966,596 B1 | * | 11/2005 | Rinehart | 296/57.1 |
| 7,031,154 B2 | | 4/2006 | Bash et al. | |
| 7,147,269 B2 | | 12/2006 | Aase et al. | |
| 7,431,380 B1 | * | 10/2008 | Buresh | 296/180.1 |
| 2006/0202508 A1 | * | 9/2006 | Aase et al. | 296/180.1 |
| 2006/0267376 A1 | | 11/2006 | McKnight et al. | |
| 2007/0216194 A1 | * | 9/2007 | Rober et al. | 296/180.1 |

* cited by examiner

*Primary Examiner*—Patricia L Engle
*Assistant Examiner*—SunSurraye Westbrook
(74) *Attorney, Agent, or Firm*—Quinn Law Group, PLLC

(57) ABSTRACT

An active material actuated louver system having an actuator mechanism operable to selectively place a louver or louver system in an open or closed state of operation. The actuator mechanism includes a cable or wire formed from an active material, such as a shape memory alloy.

16 Claims, 11 Drawing Sheets

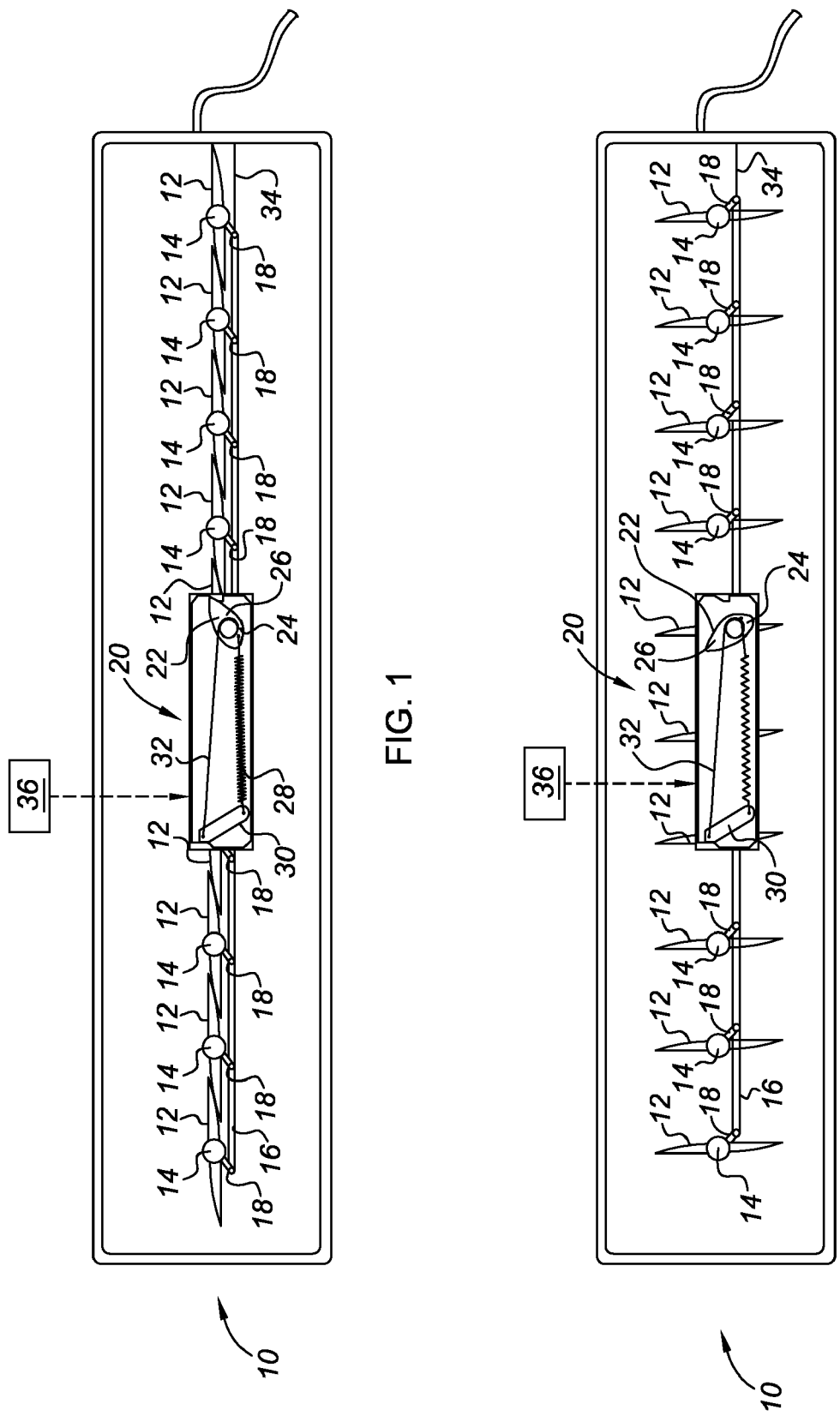

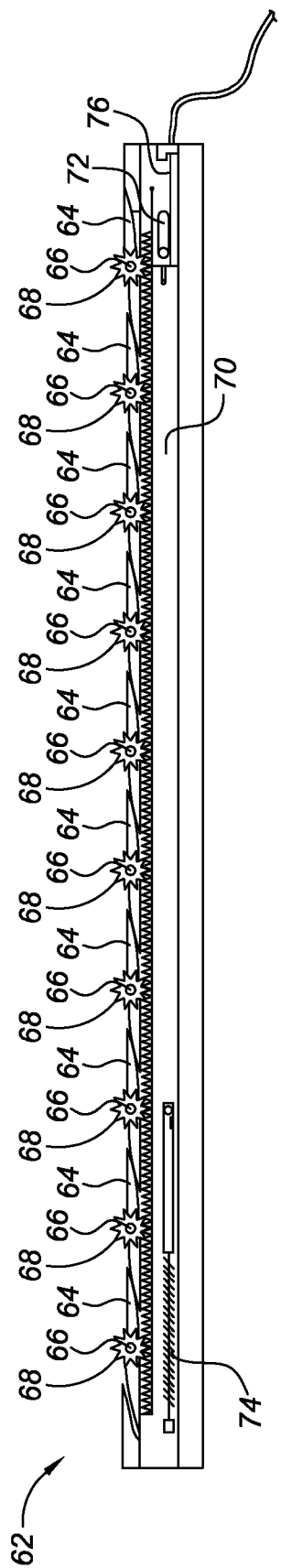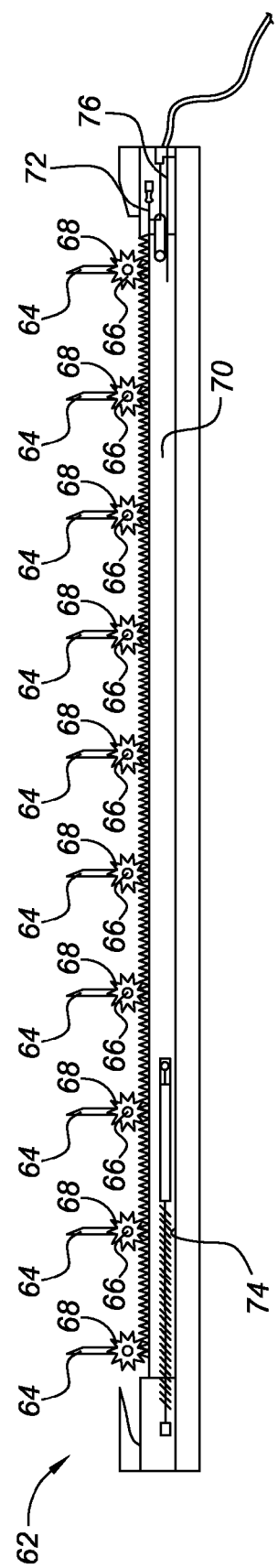

ACTIVE MATERIAL ACTUATED LOUVER SYSTEM

CROSS-REFERENCE TO RELATED APPLICATIONS

This application claims the benefit of U.S. Provisional Application 60/887,409, filed Jan. 31, 2007, which is hereby incorporated by reference in its entirety.

TECHNICAL FIELD

The present invention relates to louver systems for controlling fluid flow, such as airflow, which can be adjusted through changes in active materials contained within or comprising an actuator mechanism, the adjustment being effected through shape, dimension, and/or stiffness changes in the active material.

BACKGROUND OF THE INVENTION

Airflow over, under, around, and/or through a vehicle can affect many aspects of vehicle performance including vehicle drag, vehicle lift and down force, and cooling/heat exchange for a vehicle powertrain and air conditioning systems. Reductions in vehicle drag may improve fuel economy. Vehicle lift and down force can affect vehicle handling.

Devices known in the art of vehicle manufacture to control airflow relative to a vehicle are generally of a predetermined, non-adjustable geometry, location, orientation and stiffness. Such devices generally do not adapt as driving conditions change, thus the airflow relative to the vehicle cannot be adjusted to better suit the changing driving conditions.

SUMMARY OF THE INVENTION

An active material actuated louver system is provided having an actuator mechanism operable to selectively place the louver system in one of an open and closed state of operation, or in alternative embodiments, intermediate states of operation. The actuator mechanism includes a geometrical form such as a strip, band, rod, spring, cable or wire formed from an active material, such as a shape memory alloy. System operation is provided through active or passive actuation of the active material cable or wire. An auxiliary mechanism is provided to open the louver system in the event of failure of the primary actuator mechanism. The auxiliary mechanism is similarly operated through active or passive actuation of additional active material strips, bands, rods, springs, cables or wires.

The active material actuated louver system may include an actuator mechanism in which a movable rack pivots one or more louvers attached to gears in meshing engagement with the movable rack. In some embodiments of the invention, the actuator mechanism contains a latching or ratcheting mechanism capable of holding the louvers in a zero-energy open state, which does not require constant activation of the actuator mechanism. Tensioner springs are provided to reduce slack in the active material cables or wires while the wires are in non-activated states.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic top view of an active material actuated louver system illustrating a closed state of operation;

FIG. 2 is a schematic top view of the active material actuated louver system of FIG. 1, illustrating an open state of operation;

FIG. 5 is a schematic top view of an alternate embodiment of an active material actuated louver system illustrating a closed state of operation;

FIG. 6 is a schematic top view of the active material actuated louver system of FIG. 5, illustrating an open state of operation;

DESCRIPTION OF THE PREFERRED EMBODIMENTS

Figure 4:
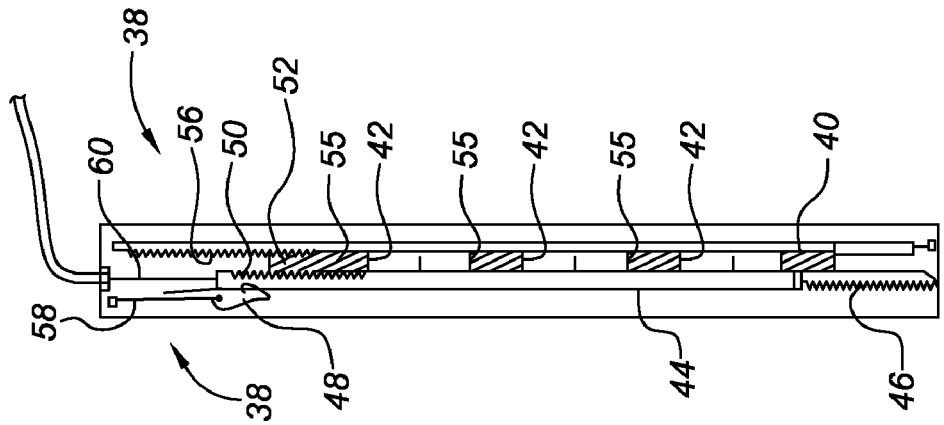
FIG. 4 is a schematic side view of the active material louver system of FIG. 3, illustrating a closed state of operation.

Referring to the drawings, wherein like reference numbers correspond to like or similar components throughout the several figures, there is shown in FIGS. 1 and 2 an active material actuated louver system 10 having a plurality of selectively openable/closable louvers 12. Each of the louvers 12 are rotatably mounted on shaft members 14. Each of the shaft members 14 are operatively connected to an actuation bar 16 through a link 18. An actuator mechanism 20 is operatively connected to the action bar 16 and operates to selectively transition the active material actuated louver system 10 between a closed state of operation, as shown in FIG. 1, and an open state of operation, as shown in FIG. 2.

The actuator mechanism 20 includes a pivotable bell crank 22 having a first arm portion 24 and a second arm portion 26. The bell crank 22 is operably connected to the actuation bar 16 and is operable to selectively move the actuation bar 16. In so doing, the actuation bar 16 effects the pivoting of the shaft members 14 through the links 18. A spring member 28 is disposed between an anchor/latch 30 and the first arm portion 24 of the bell crank 22 and is operable to bias the bell crank 22 in the clockwise direction, as viewed in FIGS. 1 and 2. Additionally, a selectively actuatable cable or wire 32 formed from active material, such as a shape memory alloy, is disposed between the anchor/latch 30 and the second arm portion 26 of the bell crank 22. The wire 32, when actuated, will contract to bias the bell crank 22 in the counter-clockwise direction, as viewed in FIGS. 1 and 2, against the bias of the spring 28. This will cause the actuation bar 16 to move rightward, as viewed in FIGS. 1 and 2, thereby placing the active material actuated louver system 10 in the open state of operation. The anchor/latch 30 is engaged latching the louvers in the open position and the actuation signal can be discontinued. Briefly reapplying the actuation signal will result in a release of the anchor/latch 30 and a return of the louvers to a closed position as a result of the action of the biasing spring 28. A cable or wire 34 formed from active material, such as a shape memory alloy, is mounted with respect to the actuation bar 16 and is operable to selectively open the louvers 12 in the event of a failure of the actuator mechanism 20.

Shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be psuedo-plastically deformed and upon exposure to some higher temperature will transform to an austenite phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

In an exemplary application, the active material actuated louver system 10 is applied to selectively limit the amount of airflow admitted into an engine compartment of a vehicle, not shown. In such application, it may be beneficial to reduce the amount of airflow entering the engine compartment in cold weather operation to reduce warm up time and increase efficiency by reducing aerodynamic drag. In such a case, the wire 32 will contract under predetermined conditions, such as when coolant temperature reaches a predetermined level, to allow airflow into the engine compartment by opening the louvers 12. The contraction (actuation) of the active material wire 32 may be effected through either passive or active means. To effect passive actuation, the wire 32 may be subject to engine compartment heat, engine heat, or engine coolant heat through either convective or conductive means. Using active means, a controller 36 may be provided to introduce a current or other stimulus to actuate the wire 32.

The wire 34 is provided as an auxiliary mechanism to selectively open the louvers 12 to avoid overheating of the engine compartment in the event the actuator mechanism 20 fails. Similar to the wire 32, the wire 34 may be actively or passively actuated. When actuated, the wire 34 will contract, biasing the actuation bar 16 rightward, as viewed in FIGS. 1 and 2, thereby opening the louvers 12.

Figure 3:
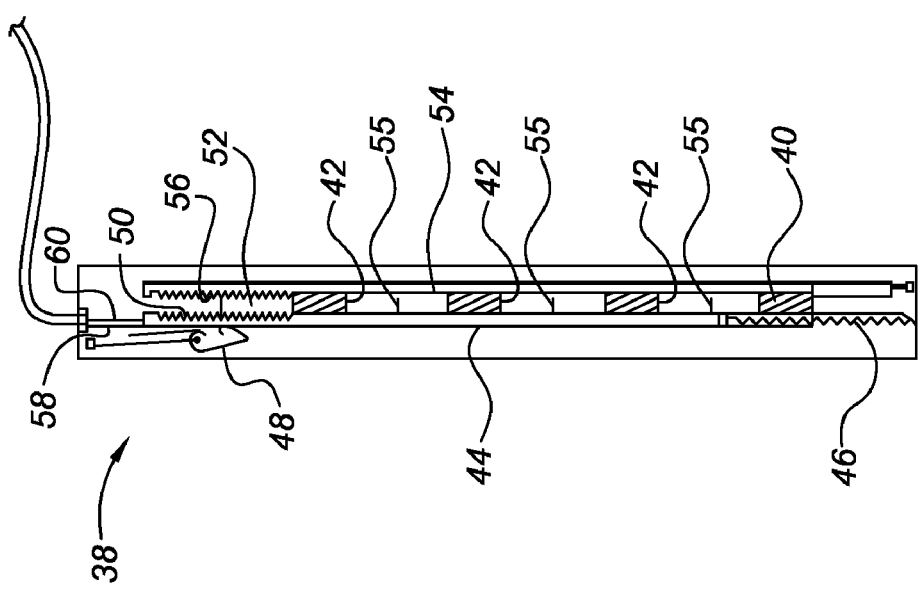
FIG. 3 is a schematic side view of an alternate embodiment of an active material louver system illustrating an open state of operation.

Referring now to FIGS. 3 and 4, there is shown an alternate embodiment of an active material actuated louver system 38. The active material actuated louver system 38 includes a stationary inner panel 40 defining a plurality of orifices 42. A rack 44 is held against the bias of spring member 46 by a latching arm 48. A plurality of teeth 50 is defined on the rack 44 and is configured to meshingly engage a gear 52. A panel 54 is mounted adjacent to the inner panel 40 and defines a plurality of orifices 55. The panel 54 defines a plurality of teeth 56 operable to meshingly engage the gear 52 such that as the rack 44 moves in one direction, the panel 54 is driven in the opposite direction by the gear 52. A cable or wire 58 formed from active material, such as a shape memory alloy, is operable to bias the rack 44 against the bias of spring member 46.

In operation, the active material actuated louver system 38 is placed in an open state of operation through the selective actuation and resulting contraction of the wire 58. By contracting the wire 58 the rack 44 is biased upward, as viewed in FIGS. 3 and 4, against the bias of the spring member 46 such that the orifices 42 of the inner panel 40 align with the orifices 55 of the panel 54. Additionally, the latching arm 48 engages the rack 44 thereby locking the active material actuated louver system 38 in the open state and the actuating signal is turned off. Should the closed state of operation of the active material actuated louver system 38 be desired, the wire 58 is briefly re-actuated thus disengaging the latching arm 48 thereby allowing the spring member 46 to bias the rack 44 downward, as viewed in FIG. 4. This downward movement of the rack 44 causes the gear 52 to urge the panel 54 upward such that the orifices 55 of the panel 54 no longer align with the orifices 42 of the inner panel 40. A cable or wire 60 formed from active material, such as a shape memory alloy, is mounted with respect to the rack 44 and is operable to selectively place the active material actuated louver system 38 in the open state of operation in the event the wire 58 is no longer operable to actuate the active material actuated louver system 38. As discussed hereinabove with regard to wires 32 and 34 of FIGS. 1 and 2, the wires 58 and 60 may be actively or passively actuated.

Referring now to FIGS. 5 and 6, there is shown an alternate embodiment of an active material actuated louver system 62. The active material actuated louver system 62 includes a plurality of louvers 64 mounted on a respective rotatable shaft member 66. A gear 68 is fixedly mounted with respect to each of the shafts 66 and is in meshing engagement with a rack 70.

A cable or wire 72 formed from active material, such as a shape memory alloy, is operably connected to the rack 70. The wire 72 is operable to bias the rack 70 against the bias of a spring member 74.

In operation, the active material actuated louver system 62 is placed in an open state of operation, as shown in FIG. 6, through the selective actuation and resulting contraction of the wire 72. By contracting the wire 72 the rack 70 is biased rightward, as viewed in FIGS. 5 and 6, against the bias of the spring member 74 such that the gears 68 rotate the louvers 64 from a closed position, shown in FIG. 5, to an open position, shown in FIG. 6. The active material actuated louver system 62 may be placed in a closed state, as shown in FIG. 5, through the selective de-actuation and relaxation of the wire 72. A cable or wire 76 formed from active material, such as a shape memory alloy, is mounted with respect to the rack 70 and is operable to selectively place the active material actuated louver system 62 in the open state of operation in the event the wire 72 is no longer operable to bias the rack 70 rightward. As discussed hereinabove with regard to wires 32 and 34 of FIGS. 1 and 2, the wires 72 and 76 may be actively or passively actuated. Again, as above, a latching system can be incorporated which allows a zero power hold of the louvers in either the open or closed position with a biasing return spring used to return the louvers to the opposite state upon release of the latch.

Figure 7:
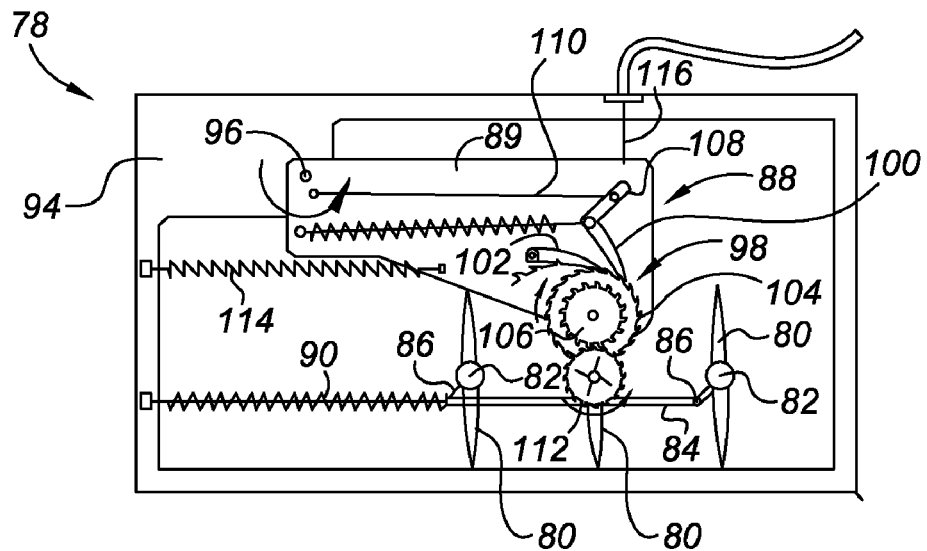
FIG. 7 is a schematic top view of an alternate embodiment of an active material actuated louver system illustrating an open state of operation.
Figure 8:
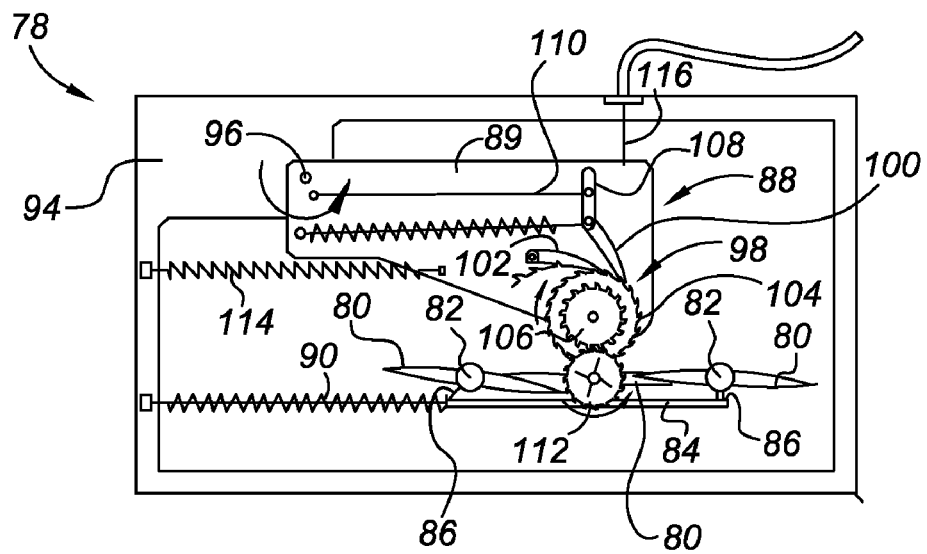
FIG. 8 is a schematic top view of the active material actuated louver system of FIG. 7, illustrating a closed state of operation.

Referring now to FIGS. 7 and 8, there is shown an alternate embodiment of an active material actuated louver system 78. The active material actuated louver system 78 includes a plurality of louvers 80, each rotatably mounted on shaft members 82. Each of the shaft members 82 are operatively connected to an actuation bar 84 through a link 86. An actuator mechanism 88 is operatively connected to the actuation bar 84 and operates to selectively transition the active material actuated louver system 78 between a closed state of operation, as shown in FIG. 8, and an open state of operation, as shown in FIG. 7. A spring member 90 is operatively connected to the actuation bar 84 and is operable to bias the actuation bar 84 to the left, as viewed in FIGS. 7 and 8, to effect the opening of the louvers 80. The actuator mechanism 88 includes a plate member 89 that is pivotably mounted with respect to a housing 94 by a pin 96. The plate member 89 has a ratchet assembly 98 mounted thereon. The ratchet assembly 98 includes a first pawl 100, a second pawl 102, a ratchet wheel 104, and a gear 106. The ratchet wheel 104 and gear 106 are rotatably mounted with respect to the plate member 89 and are mounted to each other for unitary rotation. The first pawl 100 is mounted to a bell crank 108 and is spring biased against the ratchet wheel 104. Additionally, the second pawl 102 is spring biased against the ratchet wheel 104. A cable or wire 110 formed from active material, such as a shape memory alloy, is disposed between the plate member 89 and the bell crank 108 and is operable to selectively bias the first pawl 100 against the ratchet wheel 104 to effect clockwise rotation, as viewed in FIGS. 7 and 8, thereof. A gear 112 is operatively connected to the actuator bar 84 and is in meshing engagement with the gear 106. Therefore, as the first pawl 100 effects clockwise rotation of the ratchet wheel 104 and the gear 106, as a result of selective actuation and contraction of the wire 110, the gear 112 is rotated in the counterclockwise direction, as viewed in FIGS. 7 and 8. This counterclockwise rotation of gear 112 thereby selectively and incrementally moves the louvers 80 from the open position, as shown in FIG. 7, to the closed position, as shown in FIG. 8, against the bias force of spring member 90.

A spring member 114 is disposed between the housing 94 and the plate member 89 and operates to bias the gear 106 of the ratchet assembly 98 against the gear 112, thereby maintaining the meshing engagement between gears 106 and 112. A cable or wire 116 formed from active material, such as a shape memory alloy, is mounted with respect to the plate member 89, and is operable to selectively bias the plate member 89 and the ratchet assembly 98 mounted thereto out of engagement with the gear 112. In doing so, the bias of the spring member 90 will urge the actuation bar 84 leftward thereby opening the louvers 80. Wire 116 is also beneficial to open the louvers 80 in the event of failure of the actuation mechanism 88. The wires 110 and 116 may be actively or passively actuated, as described above.

Figure 9:
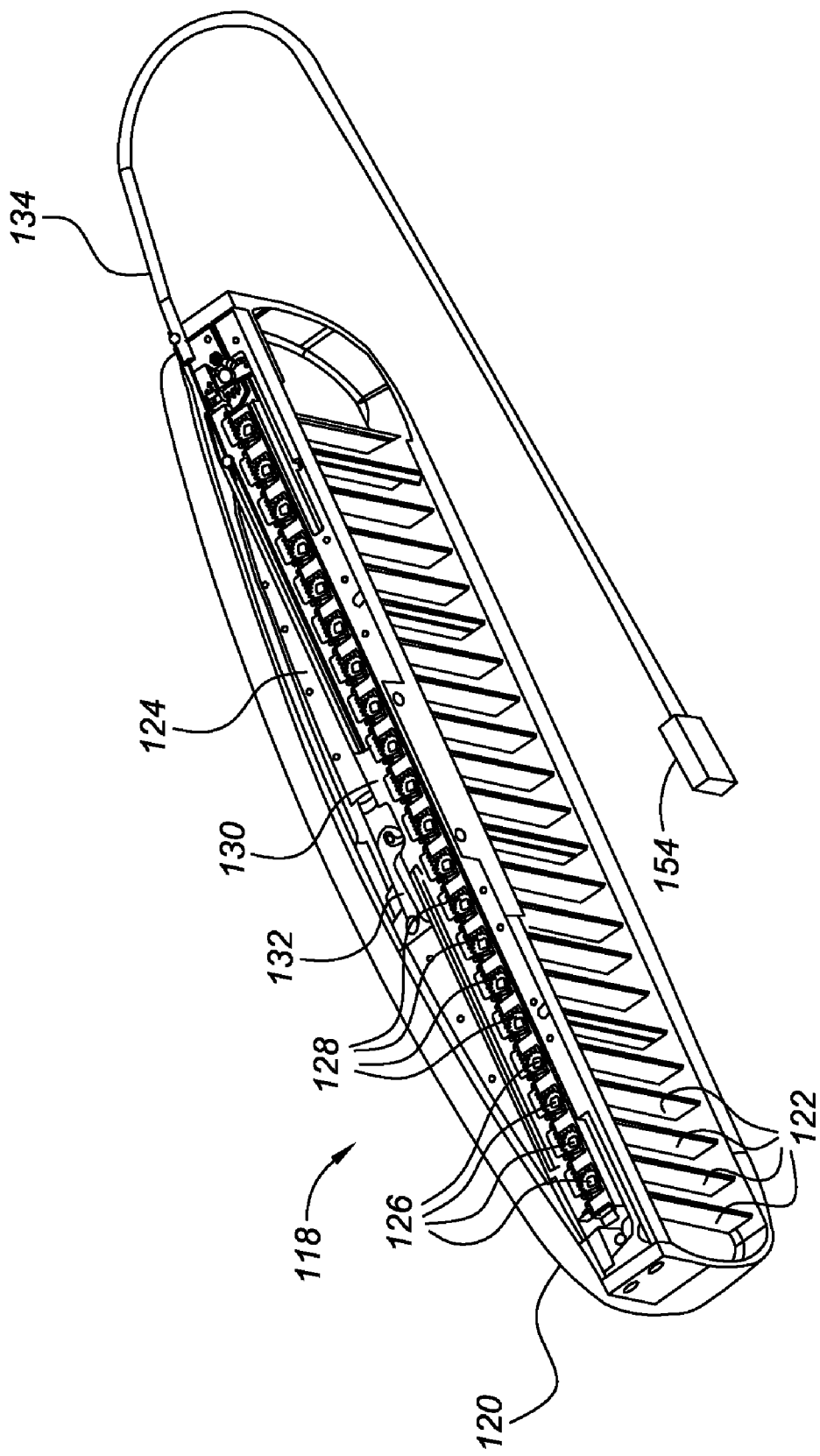
FIG. 9 is a perspective view of an alternate embodiment of an active material actuated louver system illustrating an open state of operation.

Referring to FIG. 9, there is shown an alternate embodiment of an active material actuated louver system 118. The active material actuated louver system 118 includes a housing 120 having a plurality of selectively rotatable louvers 122 disposed therein. The louvers 122 are rotatable between an open position, as shown in FIG. 9, and a closed position. An actuation mechanism 124 is mounted with respect to the housing 120 and is operable to effect rotation of the louvers 122. The louvers 122 are pivotably or rotatably mounted within the housing 120 by shaft members 126. A gear 128 is fixed to each shaft member 126 and is in meshing engagement with a rack 130. The rotation of the louvers 122 is effected by movement of the rack 130. A latching arm 132 is operable to selectively maintain the position or prevent the movement of the rack 130 when the louvers 122 are in the open position. The structure and operation of the latching arm 132 will be discussed in greater detail hereinbelow with regard to FIGS. 14 and 15. A shut-off mechanism 134 is mounted with respect to the rack 130 and is operable to bias the louvers 122 into the open position in the event of failure of the actuation mechanism 124. The shut-off mechanism 134 will be discussed in greater detail hereinbelow with reference to FIG. 13.

Figure 10:
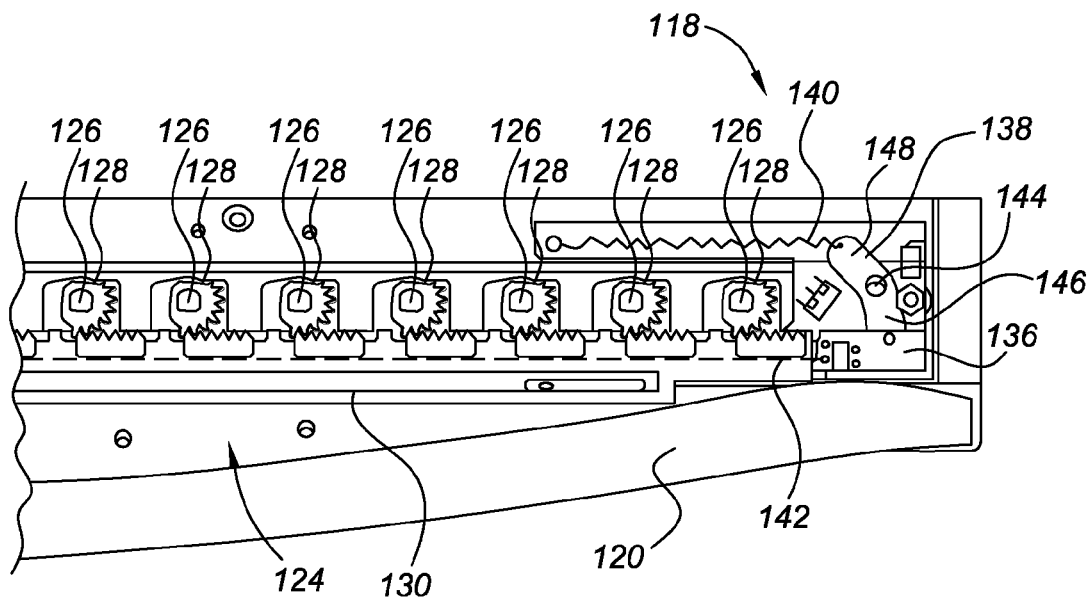
FIG. 10 is a top view of a portion of the active material actuated louver system of FIG. 9 in a closed state of operation and illustrating the operation of a tensioner block and spring.
Figure 11:
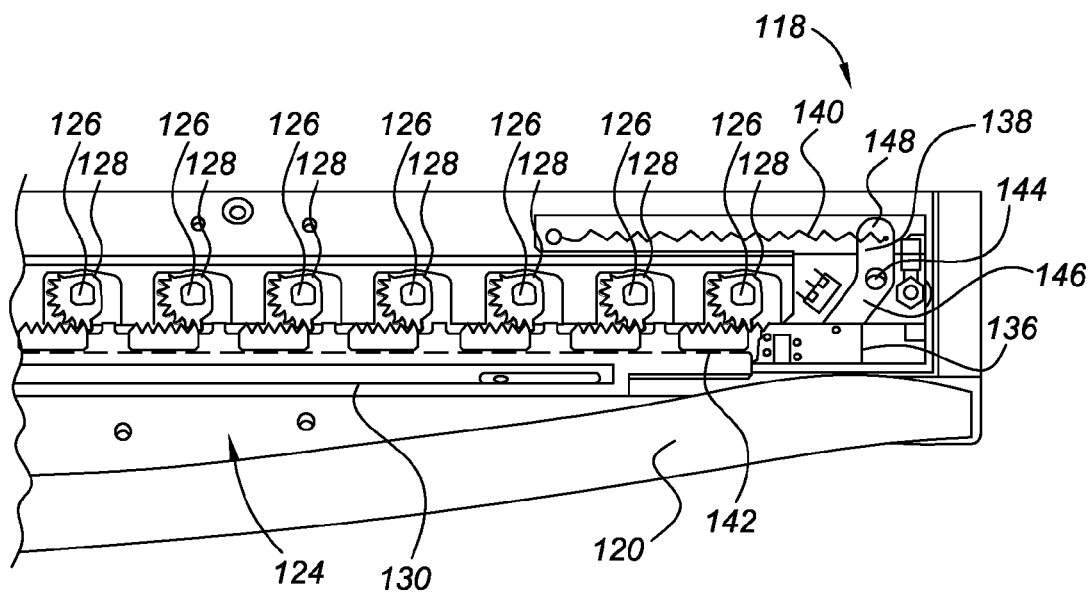
FIG. 11 is a top view of the portion, shown in FIG. 10, of the active material actuated louver system of FIG. 9 in the open state of operation and illustrating the operation of the tensioner block and spring.
Figure 12:
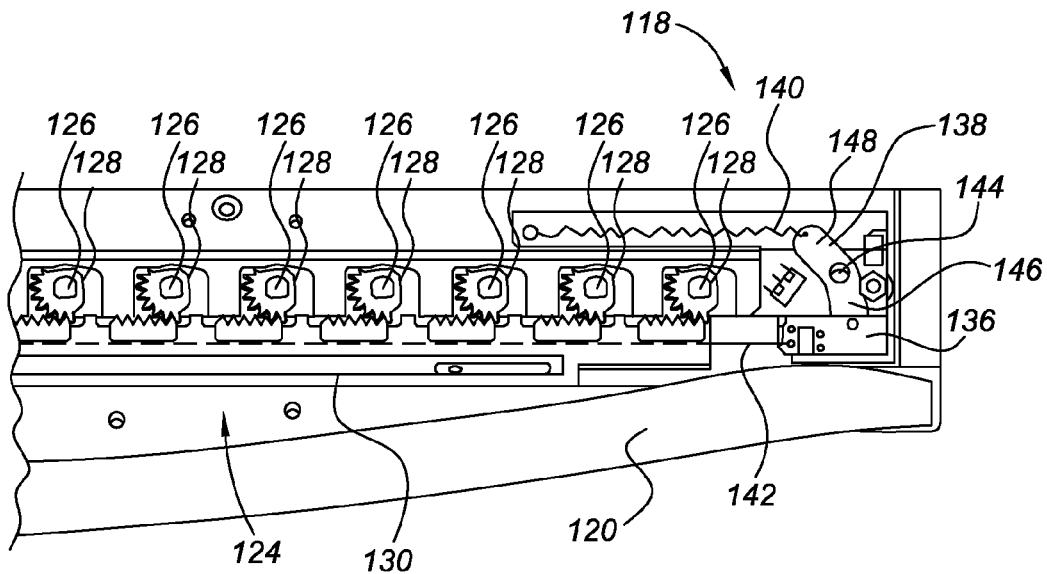
FIG. 12 is a top view of the portion, shown in FIGS. 10 and 11, of the active material actuated louver system of FIG. 9 in the open and latched state of operation and illustrating the operation of the tensioner block and spring.

Referring now to FIGS. 10-12, there is shown a portion of the active material actuated louver system 118 of FIG. 9 illustrating the actuation mechanism 124 in greater detail. The actuation mechanism 124 further includes a tensioner block 136, a bell crank 138, a spring member 140, and a cable or wire 142 (shown as a dashed line). The bell crank 138 is pivotably mounted on a pin 144 and includes a first arm portion 146 and a second arm portion 148. The spring member 140 is mounted with respect to the second arm portion 148 and is operable to bias the bell crank 138 in a counter-clockwise direction, as viewed in FIGS. 10-12. The tensioner block 136 is mounted with respect to the first arm portion 146 of the bell crank 138. The wire 142 is mounted with respect to the tensioner block 136 and is preferably formed from active material, such as a shape memory alloy. The tensioner block 136 is operable to bias the rack 130 leftward, as viewed in FIGS. 10-12, as the wire 142 is actuated to contract and open the louvers 122, as shown in FIG. 9. The wire 142 may be passively or actively actuated, as described above.

In operation, FIG. 10 illustrates the actuation mechanism 124 in the closed state of operation, wherein the rack 130 is in the rightmost position against the tensioner block 136 and the wire 142 is in the de-actuated and relaxed state. Referring to FIG. 11, the wire 142 is actuated and contracted such that the tensioner block 136 biases the rack leftward, as viewed in FIG. 11, to effect the rotation of the shaft members 126 and hence the louvers 122, shown in FIG. 9. As the rack 130 is moved leftward, the louvers 122 move from the closed position to the open position, as shown in FIG. 9. The latching arm 132 of FIG. 9 engages the rack 130 to maintain the position of the rack as the wire 142 relaxes upon deactivation. Referring now to FIG. 12, the wire 142 is illustrated in the relaxed state. The spring member 140 biases the bell crank 138 in the counter-clockwise direction thereby urging the tensioner block 136 rightward to maintain the wire 142 in a taut condition. This is beneficial to the reliable operation of the actuation mechanism 124 by reducing the likelihood of the wire 142 becoming snagged on, or shorting to, other parts of the actuation mechanism 124.

Figure 13:
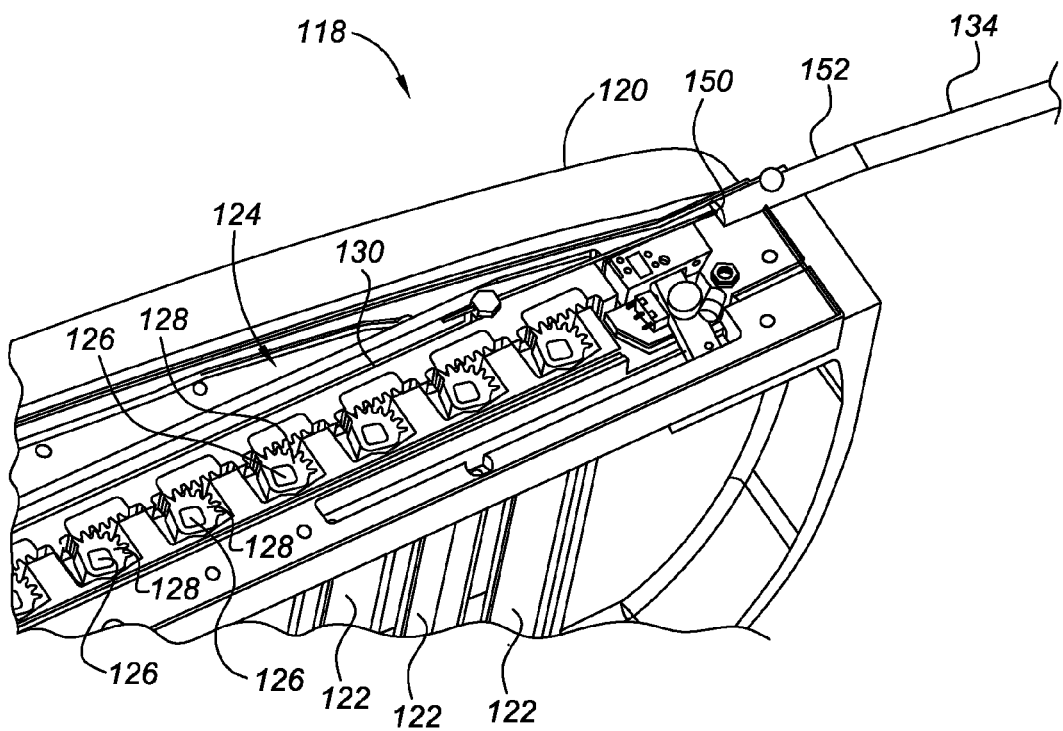
FIG. 13 is a perspective view of a portion of the active material actuated louver system of FIG. 9 and illustrating a shut-off mechanism.

Referring to FIG. 13, there is shown a portion of the active material actuation louver system 118 illustrating the structure and operation of the shut-off mechanism 134. The shut-off mechanism 134 includes a cable or wire 150 formed from active material, such as a shape memory alloy, and a sheath 152 having a polyvinylchloride coated flexible steel tube encasing a polytetrafluoroethylene inner tube within which the wire 150 translates. The wire 150 has one end mounted to the rack 130 and the opposite end fixed at an anchor block 154, shown in FIG. 9. The anchor block 154 may be used to provide adjustment to the length of the wire 150. The wire 150 is preferably substantially the same length as the effective length of wire 142 of FIGS. 10-12 such that it has the capacity to move the rack 130 and effect the opening of louvers 122 in the event of a failure of the actuation mechanism 124. The wire 150 may be actively or passively actuated, such as through one of the methods described above. As an alternative method of passive actuation, the end of the auxiliary shut-off mechanism 134 having the anchor block 154 attached thereto is placed such that when the ambient temperature of the location exceeds a predetermined temperature, the wire 150 will contract to bias the rack 130, thereby opening the louvers 122 to avoid an overheat condition.

Figure 14:
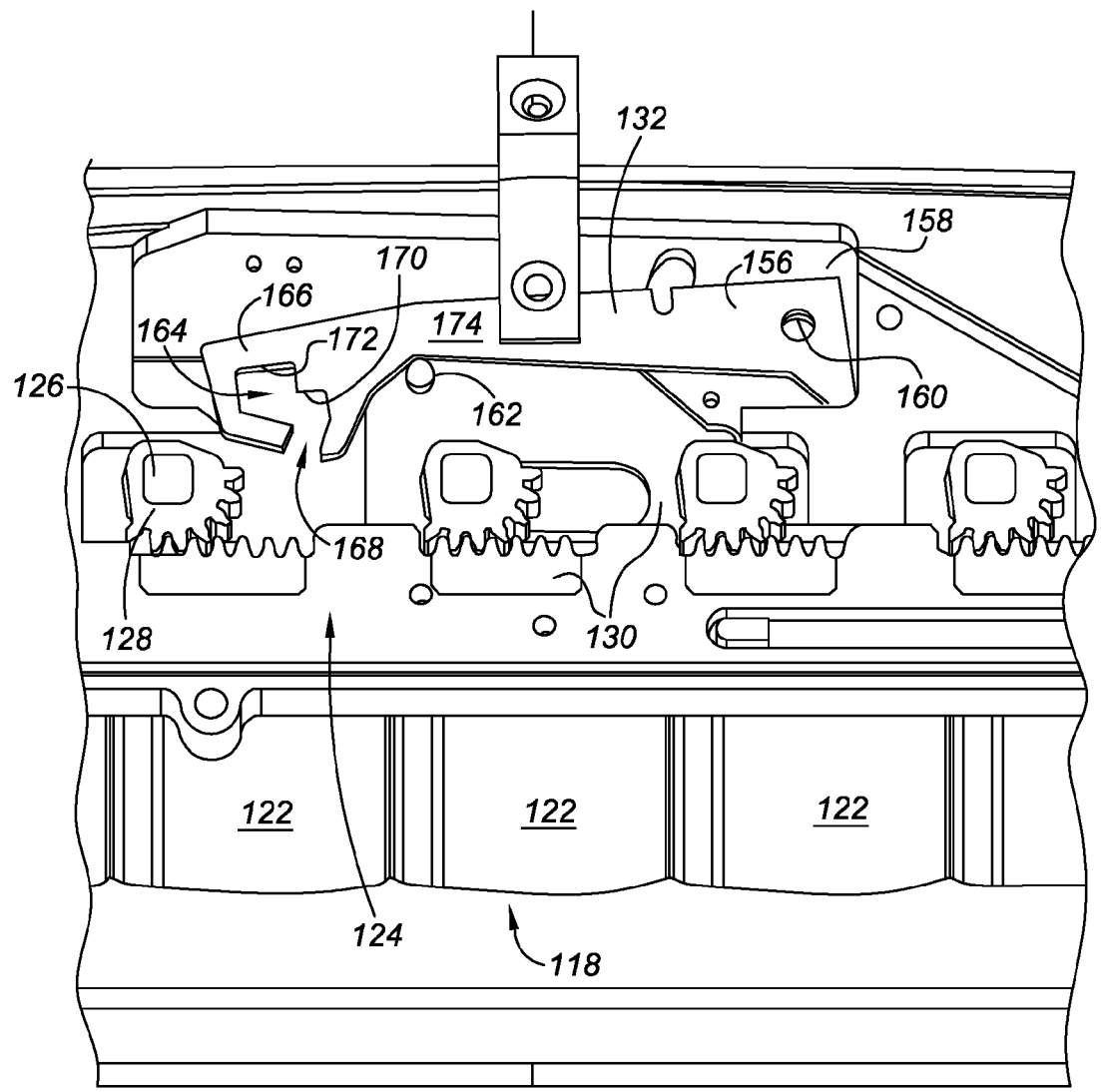
FIG. 14 is a perspective view of a portion of the active material actuated louver system of FIG. 9 in the closed state of operation and illustrating a latching arm.
Figure 15:
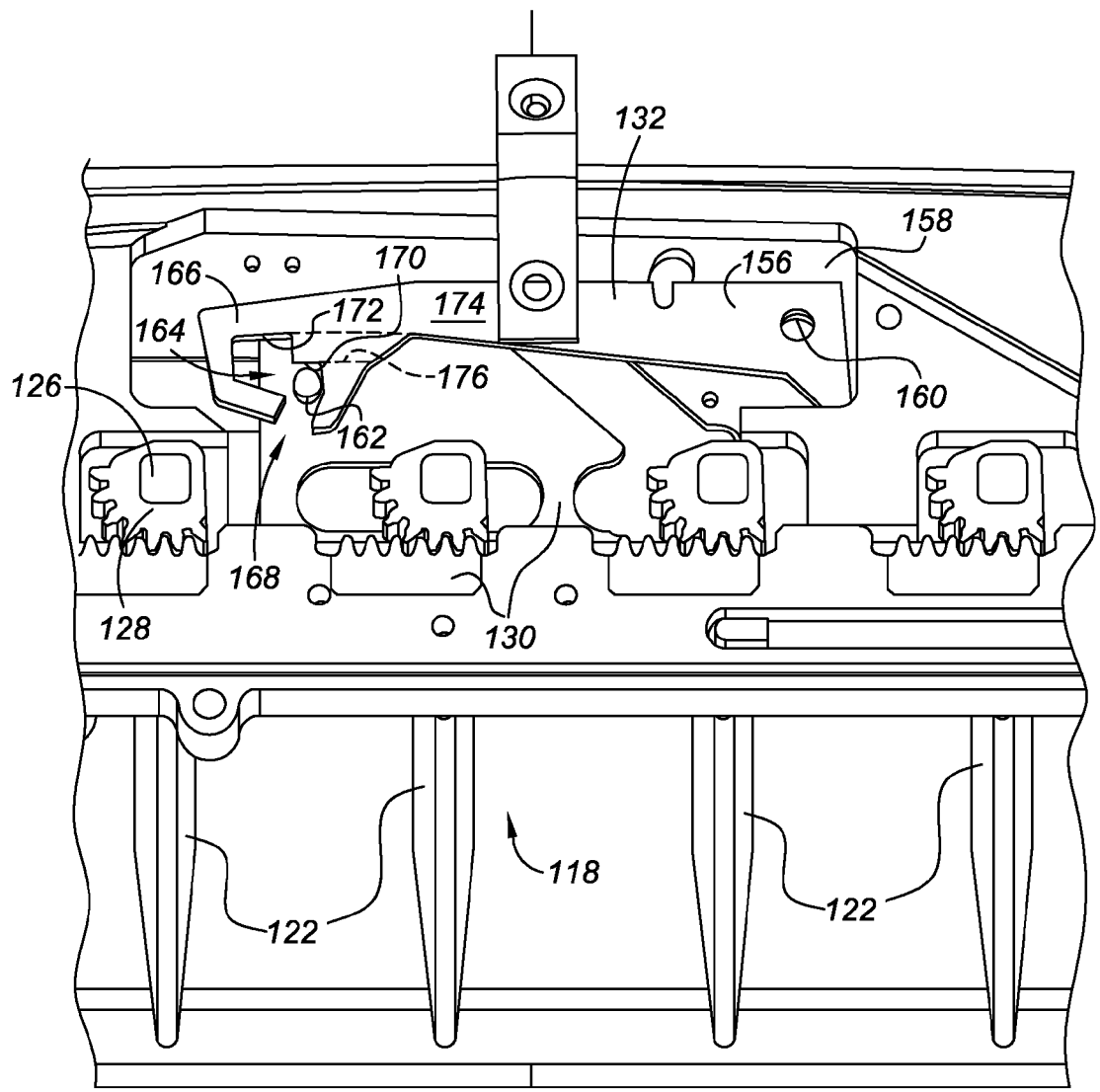
FIG. 15 is a perspective view of a portion of the active material actuated louver system of FIG. 9 in the open and latched state of operation and illustrating the latching arm of FIG. 14.

Referring to FIGS. 14 and 15, there is shown a portion of the active material actuation louver system 118 of FIG. 9, illustrating the structure and operation of the latching arm 132. The latching arm 132 is pivotably mounted at a first end 156 to a stationary member 158 of the actuation mechanism 124. A torsion spring 160 is operable to bias the latching arm 132 in the counter-clockwise direction, as viewed in FIGS. 14 and 15 against a pin 162 mounted with respect to the rack 130. A latch portion 164 is formed on a second end 166 of the latching arm 132 and is operable to selectively engage the pin 162 thereby latching or maintaining the rack 130 in position when the louvers 122 are in the open position. The latch portion 164 includes an opening 168 defined by the second end 166 of latching arm 132 and sufficiently configured to pass the pin 162 therethrough. Additionally, the latch portion 164 includes a first and second detent portion 170 and 172, respectively.

In operation, with reference to FIG. 14, the active material actuation louver system 118 is in the closed state. That is, the louvers 122 are closed and a beam portion 174 of the latching arm 132 rests against the pin 162. Referring now to FIG. 15, the rack 130 has been moved leftward, as viewed in FIG. 15, such that the gears 128 rotate the shaft members 126 thereby opening the louvers 122. As the rack 130 is moved leftward, the pin 162 rides against the second end 166 of the latching arm 132 until it passes through the opening 168 and rests against the first detent portion 170. In this position, the latching arm 132 cooperates with the pin 162 to prevent the rightward movement of the rack 130, thereby holding the louvers 122 in the open position. A ramp feature 176, shown in dashed lines in FIG. 15, is provided on the underside of the latching arm 132 and generally diverges toward the second detent portion 172. The ramp feature 176 is operable to de-latch the rack 130 to close the louvers 122. To close the louvers 122, the rack 130 is moved further leftward such that the pin 162 moves from the first detent portion 170 to the second detent portion 172, thereby aligning the pin 162 with the ramp feature 176. The rack 130 is biased rightward by a spring, not shown, or other means forcing the pin 162 to travel along the ramp feature 176, under the latch portion 164 of the latching arm 132, to arrive at the position shown in FIG. 14.

Figure 16:
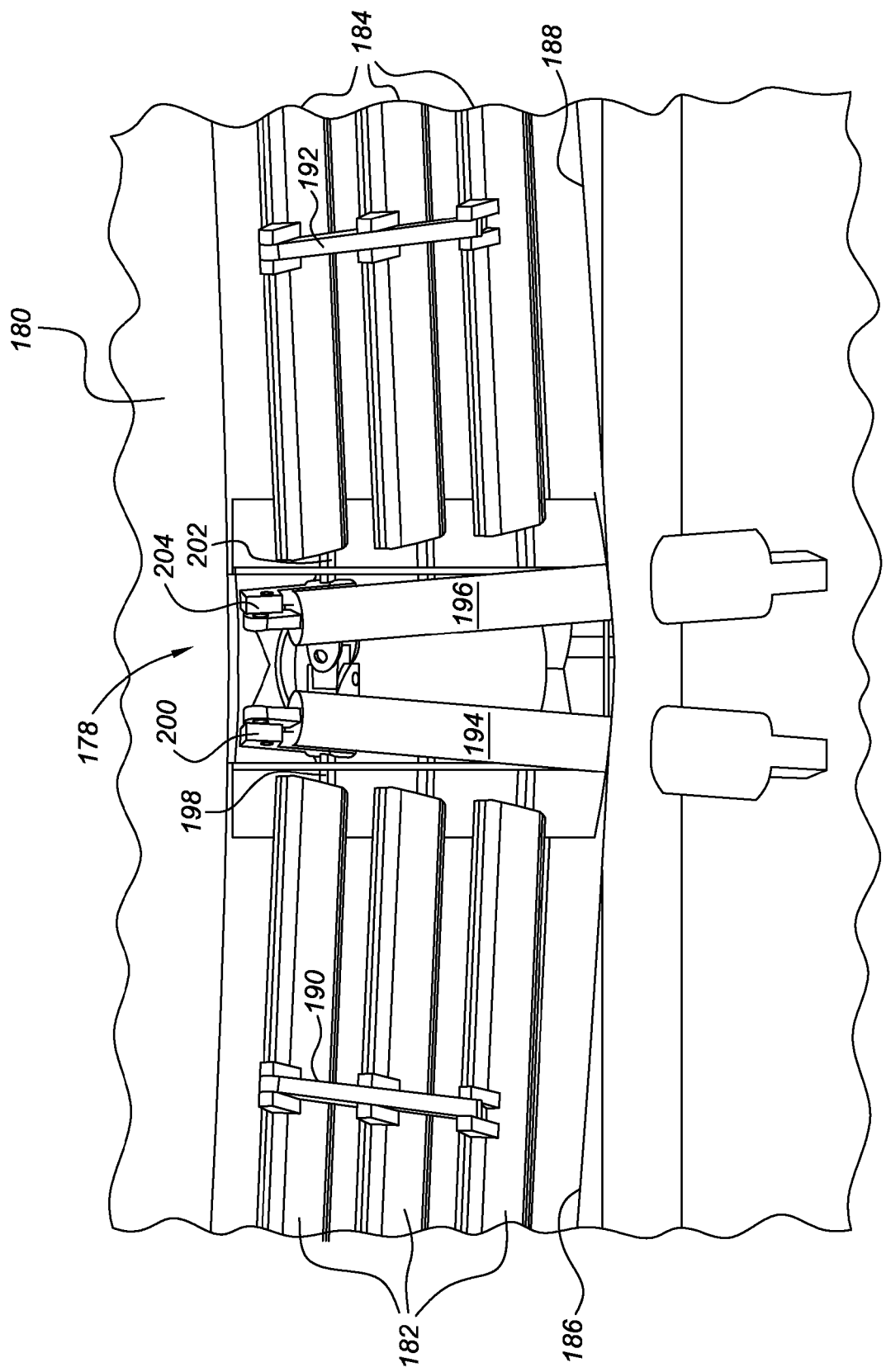
FIG. 16 is a perspective view of a front fascia of a vehicle having an active material actuated louver system mounted thereto.

Referring now to FIG. 16, there is shown an alternate embodiment of an active material actuated louver system 178 mounted within a front fascia 180 of a vehicle. The active material actuated louver system 178 includes a first and second plurality of selectively openable/closable louvers 182 and 184, respectively, mounted within a respective first opening 186 and second opening 188 defined by the front fascia 180. The louvers 182 are interconnected by a linkage 190 for unitary movement, while the louvers 184 are interconnected by a linkage 192 for unitary movement. A first and second actuator mechanism 194 and 196, respectively, operate to selectively open and close the respective louvers 182 and 184. The first actuator mechanism 194 is coupled to a shaft member 198 via a linkage 200. The shaft member 198 pivotably supports one of the plurality of louvers 182, such that the first actuator mechanism 194 need only rotate the shaft member 198 via the linkage 200 to effect the operation of each of the plurality of louvers 182. Similarly, the second actuator mechanism 196 is coupled to a shaft member 202 via a linkage 204. The shaft member 202 pivotably supports one of the plurality of louvers 184, such that the second actuator mechanism 196 need only rotate the shaft member 202 via the linkage 204 to effect the operation of each of the plurality of louvers 184. The first and second actuator mechanisms 194 and 196 are actuated by means of an active material, such as a shape memory allow material. The first and second actuator mechanisms 194 and 196 may be actively or passively actuated, as described hereinabove.

Figure 17:
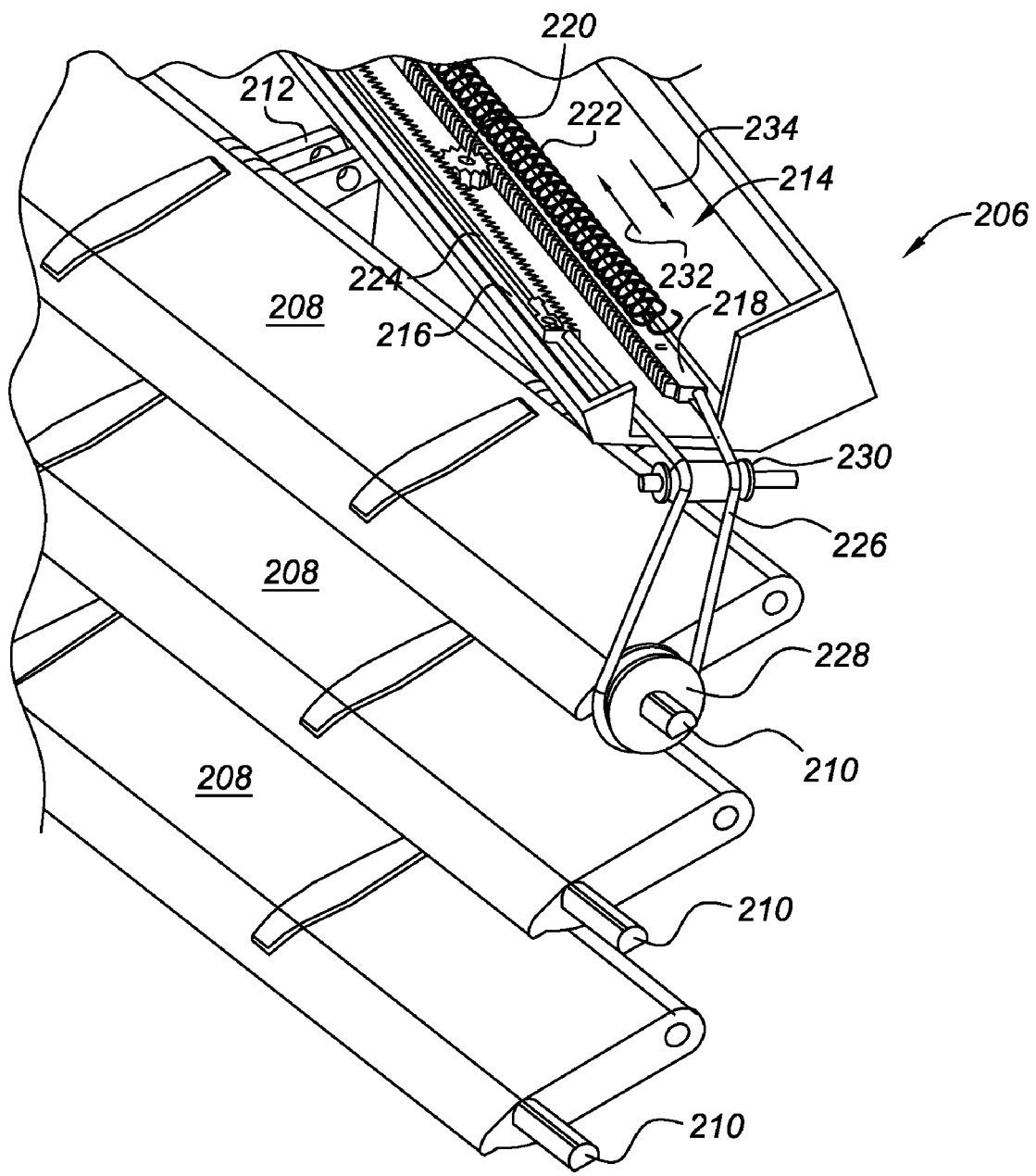
FIG. 17 is a perspective view of an alternate embodiment of an active material actuated louver system in an open state of operation.

Referring to FIG. 17, there is shown an alternate embodiment of an active material actuated louver system 206. The active material actuated louver system 206 includes a plurality of selectively openable/closeable louvers 208 rotatably supported on a respective shaft member 210. The louvers 208 are interconnected by a linkage 212 for unitary movement. An actuator mechanism 214 operates to selectively rotate the louvers 208 between a closed position and an open position, shown in FIG. 17. The actuator mechanism includes a first and second rack 216 and 218, respectively. A gear 220 is in meshing engagement with each of the first and second racks 216 and 218. A spring member 222 is operable to bias the second rack 218, while a cable or wire 224 formed from an active material, such as a shape memory alloy, is mounted with respect to the first rack 216. The wire 224 is operable to bias the first rack 216 when the wire 224 is actuated resulting in the contraction of the wire 224. A belt 226 interconnects the first and second racks 216 and 218 and generally circumscribes a pulley 228 mounted to one of the shaft members 210 for unitary rotation therewith. A pulley 230 is provided to alter the force vectors of the belt 226.

In operation, to place the louvers 208 in the open position, as shown in FIG. 17, the wire 224 is actuated and contracted, thereby biasing the first rack 216 in the direction of arrow 232 which causes an opposing movement of the second rack 218, against the bias of spring 222, in the direction of arrow 234. The movement of the first and second racks 216 and 218 urges the belt 226 to drive the pulley 228 in the clockwise direction, as viewed in FIG. 17, thereby opening the louvers 208. Alternately, to place the louvers 208 in a closed position, the wire 224 is de-actuated and relaxed thereby reducing the bias force acting on the first rack 216. The spring 222 biases the second rack in the direction of arrow 232, which causes an opposing movement of the first rack 216 in the direction of arrow 234. The movement of the first and second racks 216 and 218 urges the belt 226 to drive the pulley 228 in the counter-clockwise direction, as viewed in FIG. 17, thereby closing the louvers 208. As in other embodiments, a latch could be used to provide a zero power hold in either the open or closed positions.

The louvers 12 of FIGS. 1 and 2, louvers 64 of FIGS. 5 and 6, louvers 80 of FIGS. 7 and 8, louvers 122 of FIGS. 9 and 13-15, louvers 182 and 184 of FIG. 16, and louvers 208 of FIG. 17 are hereinafter collectively referred to simply as "louvers". The louvers are preferably formed from a material of sufficient strength and have sufficient thickness to avoid excessive deflection in operation. Additionally, the louvers may have a low friction surface coating or a hydrophobic coating to reduce the accumulation of foreign substances thereon that may impede the movement of the louvers. Furthermore, fluid circuits may be provided within the louvers to warm the louver in application where ice or snow buildup may occur. Debris or foreign material may be cleared from the louvers by impinging jets. The louvers may be formed having an aerodynamic shape and pivot points may be chosen to aid in the opening and/or closing of the louvers. Additionally, the louvers described herein above have a "fail-to-open" failure mode wherein the louvers will open in the event of a failure of the actuation mechanisms thereby avoiding an overheat condition.

The cables or wires, 32 and 34 of FIGS. 1 and 2, 58 and 60 of FIGS. 3 and 4, 72 and 76 of FIGS. 5 and 6, 110 and 116 of FIGS. 7 and 8, 142 of FIGS. 10-12, 150 of FIG. 13, and 224 of FIG. 17 may be formed from any type of elongated active material including those with round, oval, rectangular, square, etc., cross sections. Additionally, a load limiter may be included within the various actuator mechanisms described hereinabove to protect against overstressing the cables or wires. Such a load limiter may include a cam biased by a high tension spring mounted opposite the cable or wire.

In addition to the specific active materials mentioned above, those skilled in the art will recognize that other embodiments of the active material actuated louver systems described herein may make use of a wide variety of active materials. Suitable active materials include, without limitation, shape memory alloys (SMA), shape memory polymers (SMP), piezoelectric materials, electroactive polymers (EAP), ferromagnetic materials, magnetorheological fluids (as latching mechanisms) and elastomers (MR) and electrorheological fluids (ER) (as latching mechanisms).

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape orientation that was previously exhibited. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the shape memory material with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

Other suitable active materials are shape memory polymers. Similar to the behavior of a shape memory alloy, when the temperature is raised through its transition temperature, the shape memory polymer also undergoes a change in shape orientation. Dissimilar to SMAs, raising the temperature through the transition temperature causes a substantial drop in modulus. While SMAs are well suited as actuators, SMPs are better suited as "reverse" actuators. That is, by undergoing a large drop in modulus by heating the SMP past the transition temperature, release of stored energy blocked by the SMP in its low temperature high modulus form can occur. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape of the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C, more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly (ethylene terephthalate), polyethylene/nylon (graft copolymer), polycaprolactones-polyamide (block copolymer), poly (caprolactone)dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including Fe2O3 and Fe3O4; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Average dimension sizes for the particles can be less than or equal to about 1,000 micrometers, with less than or equal to about 500 micrometers preferred, and less than or equal to about 100 micrometers more preferred. Also preferred is a particle dimension of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape orientation sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Employing the piezoelectric material will utilize an electrical signal for activation. Upon activation, the piezoelectric material can cause displacement in the powered state. Upon discontinuation of the activation signal, the strips will assume its original shape orientation, e.g., a straightened shape orientation.

Preferably, a piezoelectric material is disposed on strips of a flexible metal or ceramic sheet. The strips can be unimorph or bimorph. Preferably, the strips are bimorph, because bimorphs generally exhibit more displacement than unimorphs.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrene-sulfonate) ("PSS"), poly S-119 (poly(vinylamine)backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof, and Group VIA and IIB compounds, such as CdSe, CdS, GaAs, $AgCaSe_2$, ZnSe, GaP, InP, ZnS, and mixtures thereof. Suitable active materials include, without limitation, shape memory alloys (SMA), ferromagnetic SMAs, shape memory polymers (SMP), piezoelectric materials, electroactive polymers (EAP), magnetorheological fluids and elastomers (MR), and electrorheological fluids (ER).

The activation signal provided by the activation device may include a heat signal, a magnetic signal, an electrical signal, a pneumatic signal, a mechanical signal, and the like, and combinations comprising at least one of the foregoing signals, with the particular activation signal dependent on the materials and/or configuration of the active material. For example, a magnetic and/or an electrical signal may be applied for changing the property of the active material fabricated from magnetostrictive materials. A heat signal may be applied for changing the property of the active material fabricated from shape memory alloys and/or shape memory polymers. An electrical signal may be applied for changing the property of the active material fabricated from electroactive materials, piezoelectrics, electrostatics, and/or ionic polymer metal composite materials.

While examples of automotive applications of the active material actuated louver systems are provided hereinabove, those skilled in the art will recognize that the active material actuated louver systems described herein may be used in other non-automotive applications as well. While the best modes for carrying out the invention have been described in detail, those familiar with the art to which this invention relates will recognize various alternative designs and embodiments for practicing the invention within the scope of the appended claims.

The invention claimed is:

1. A louver system comprising:
   an actuator mechanism including at least one selectively actuatable wire formed from an active material operable to change shape when actuated;
   a louver operatively selectively pivotable between an open position and a closed position, said louver being operatively connected to said actuator mechanism;
   wherein said actuator mechanism is operable to selectively pivot said louver when said at least one selectively actuatable wire is actuated;
   a shut-off mechanism operatively connected to said actuator mechanism and operable to cause said actuator mechanism to selectively pivot said louver into said open position in the event of failure of said actuator mechanism; and
   wherein said shut off mechanism includes at least one other selectively actuatable wire formed from shape memory alloy, having a first end anchored and a second end mounted to said actuator mechanism, and wherein said at least one other selectively actuatable wire actuates said actuator mechanism when said at least one other selectively actuatable wire is actuated.

2. The louver system of claim 1, wherein said active material is a shape memory alloy.

3. The louver system of claim 1, wherein said at least one selectively actuatable wire is actuated in response to one of convective or conductive heat from one of engine compartment heat, engine heat, or engine coolant heat.

4. The louver system of claim 1, wherein said at least one selectively actuatable wire and said at least one other selectively actuatable wire are substantially the same lengths.

5. The louver system of claim 1, further comprising:
a movable rack;
a pivotable shaft having said louver mounted thereon;
a gear mounted to said shaft for unitary rotation therewith;
wherein said movable rack is in meshing engagement with said gear; and
wherein said at least one selectively actuatable wire is mounted with respect to said movable rack and operable to move said movable rack to pivot said louver when said at least one selectively actuatable wire is actuated.

6. The louver system of claim 5, further comprising:
a pin mounted with respect to said movable rack; and
a latching arm operable to selectively engage said pin to prevent the movement of said movable rack.

7. The louver system of claim 1, further comprising a spring member operable to tension said at least one selectively actuatable wire.

8. The louver system of claim 1, said actuator mechanism including a ratchet mechanism operable to selectively pivot said at least one louver, wherein said at least one selectively actuatable wire is operable to effect movement of said ratchet mechanism when said at least one selectively actuatable wire is actuated.

9. A louver system comprising:
an actuator mechanism including at least one selectively actuatable wire formed from an active material operable to change shape when actuated;
a louver operatively selectively pivotable between an open position and a closed position, said louver being operatively connected to said actuator mechanism;
wherein said actuator mechanism is operable to selectively pivot said louver when said at least one selectively actuatable wire is actuated;
a movable rack;
a pivotable shaft having said louver mounted thereon;
a gear mounted to said shaft for unitary rotation therewith;
wherein said movable rack is in meshing engagement with said gear;
wherein said at least one selectively actuatable wire is mounted with respect to said movable rack and operable to move said movable rack to pivot said louver when said at least one selectively actuatable wire is actuated;
a pin mounted with respect to said movable rack; and
a latching arm operable to selectively engage said pin to prevent the movement of said movable rack.

10. The louver system of claim 9, wherein said active material is a shape memory alloy.

11. The louver system of claim 10, further comprising a shut-off mechanism operatively connected to said actuator mechanism and operable to cause said actuator mechanism to selectively pivot said louver into said open position in the event of failure of said actuator mechanism.

12. The louver system of claim 11, wherein said shut off mechanism includes at least one other selectively actuatable wire having a first end anchored and a second end mounted to said actuator mechanism and wherein said at least one other selectively actuatable wire actuates said actuator mechanism when said at least one other selectively actuatable wire is actuated.

13. The louver system of claim 12, wherein said at least one other selectively actuatable wire is formed from shape memory alloy.

14. The louver system of claim 9, further comprising a spring member operable to tension said at least one selectively actuatable wire.

15. A louver system comprising:
an actuator mechanism including at least one selectively actuatable wire formed from an active material operable to change shape when actuated;
a louver operatively selectively pivotable between an open position and a closed position, said louver being operatively connected to said actuator mechanism;
wherein said actuator mechanism is operable to selectively pivot said louver when said at least one selectively actuatable wire is actuated, wherein said at least one selectively actuatable wire is actuated in response to one of convective or conductive heat from one of engine compartment heat, engine heat, or engine coolant heat; and
a spring member operable to tension said at least one selectively actuatable wire.

16. The louver system of claim 15, wherein said active material is a shape memory alloy.

* * * * *